March 20, 1945.  R. B. KINGMAN  2,371,895
STRAINER UNIT
Filed Nov. 18, 1943
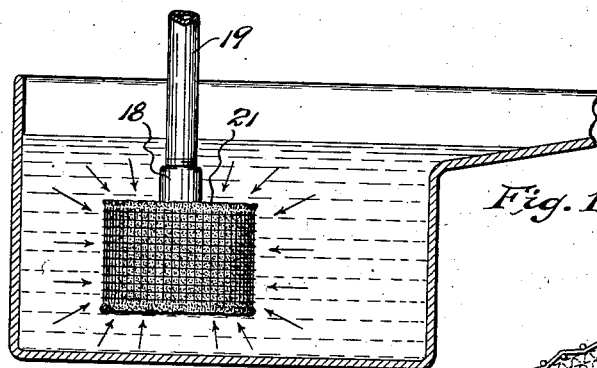
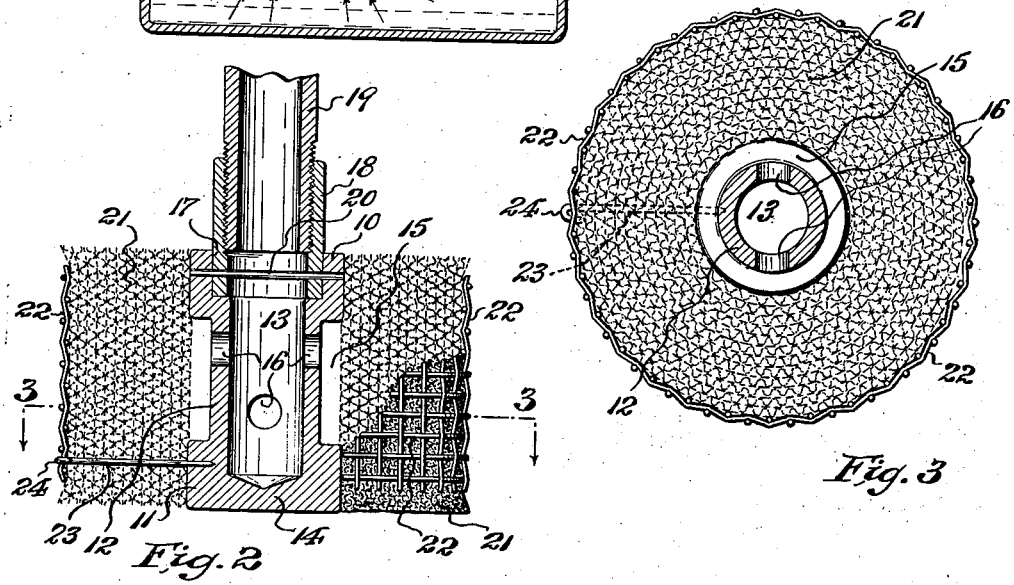
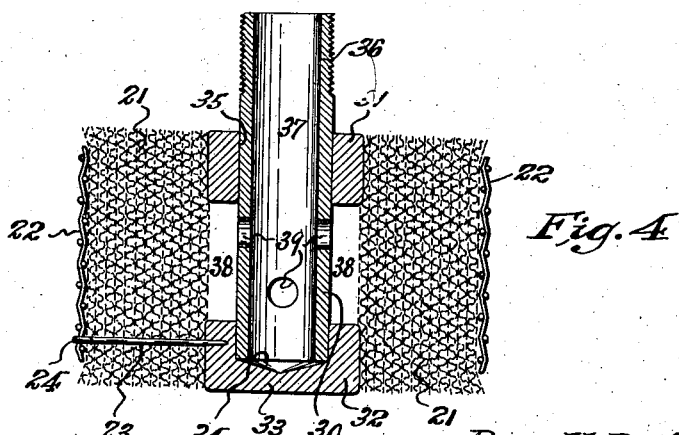
INVENTOR.
Russell B. Kingman,
BY George D. Richards,
ATTORNEY.

Patented Mar. 20, 1945

2,371,895

UNITED STATES PATENT OFFICE 2,371,895

STRAINER UNIT

Russell B. Kingman, Orange, N. J., assignor to Metal Textile Corporation, West Orange, N. J., a corporation of Delaware Application November 18, 1943, Serial No. 510,774

4 Claims. (Cl. 210—170)

This invention relates to improvements in strainers, and the invention has reference, more particularly, to a novel construction of strainer unit adapted to separate suspended solids from fluids desired to be clarified.

The invention has for an object to provide a novel construction of strainer unit adapted to provide, in given sizes thereof, a strainer body of considerable mass and of maximum effective external surface area, whereby flow of fluid therethrough is subjected to a minimum of restriction without impairment of its straining efficiency.

Another object of the invention is to provide a novel strainer unit of high efficiency but low cost, whereby, after its efficient use life terminates, the same may be thrown away and replaced by a new unit.

A further object of the invention is to provide a novel strainer unit formed by a mass of mesh material, preferably a knitted wire mesh, mounted on and affixed to a spool-like core, the latter providing an axial discharge passage and an annular plenum interiorly of the mesh mass and in communication with said discharge passage; means being provided for coupling the core to clean fluid conduit means.

Another object of this invention is to provide a strainer unit of the character stated which is adapted for general use, but which is especially well adapted for use as a coolant cleansing means in coolant circulating systems for machine tools, grinding and polishing machines, and the like.

Other objects of this invention, not at this time more particularly enumerated, will be understood from the following detailed description of the same.

Illustrative embodiments of the invention are shown in the accompanying drawing, in which—

Fig. 1 is an elevational view of the novel strainer unit according to this invention as operatively submerged in a sump or reservoir to which fluid desired to be cleansed is supplied; Fig. 2 is an enlarged vertical sectional view, with parts in elevation, of one form of the strainer unit; and Fig. 3 is a horizontal sectional view, taken on line 3—3 in Fig. 2.

Fig. 4 is a vertical sectional view of a somewhat modified form of the strainer unit according to this invention.

Similar characters of reference are employed in the above described views to indicate corresponding parts.

In the illustrative form of strainer unit as shown in Figs. 2 and 3, said unit comprises a spool-like core formed by longitudinally spaced heads 10 and 11 which are connected by an intermediate shank portion 12 of reduced diameter. Said spool-like core is provided with an axial passage 13 which opens outwardly through the head 10 but is closed by an end wall 14 provided in connection with the opposite head 11. Intermediate the heads 10 and 11 and surrounding the shank portion 12 is an annular space 15. Provided in the walls of said shank portion 12 are one or more through openings 16 to afford communication between said external annular space 15 and the internal axial passage 13.

Said spool-like core is made of wood, plastic material or like inexpensive and easily worked material. Formed in the head 10, around the outwardly open end of the axial discharge passage 13 is a diametrically enlarged annular seat or socket 17 adapted to receive a coupling bushing 18, which is suitably screw-threaded to engage and couple the core to and in communication with a clean fluid conduit means 19. Said coupling bushing 18 is affixed to the core by a transverse anchoring pin 20 which is passed through and across the head 10 and the inserted end of said coupling bushing 18.

Mounted on and around the spool-like core is an annular foraminous strainer body 21, which is formed by rolling mesh material upon itself into a multiplicity of convolved contiguous layers, until a desired mass and diameter of strainer body is attained. Preferably the strainer body 21 is thus formed from knitted single ply metallic mesh, or from double ply mesh provided by flattened tubular knit mesh. The mesh may be knitted from either round, flat or wire of any other selected cross-sectional shape. To increase the labyrinthic ramification of the strainer body mass, the mesh, before it is rolled upon itself into the body formation, it is desirable to corrugate or crimp the mesh in such manner that the corrugations extend obliquely across the width of the mesh strip. Thus corrugated mesh strips are superposed in such manner that the corrugations of adjacent layers are disposed to cross each other when the superposed strips are rolled into the body forming mass. By such form and arrangement of mesh layers, the body mass will be provided throughout with substantially uniformly distributed intercommunicating interstices; and, furthermore, contiguously adjacent mesh layers will be substantially interlocked together against relative sliding displacement. The interstices may be optionally modified in size by employing knitted mesh of selected loop size, whereby a foraminous mass of desired given density and porosity may be obtained.

To form the strainer body 21 about the core, mesh strip or strips, substantially corresponding in width to the height or length of the core, are wound on and about the same until a desired diameter and mass of strainer body 21 is obtained. In this manner the interior side of the strainer body is disposed to bridge the annular space 15 intermediate the heads 10 and 11 of the core, with substantial marginal portions of the inner surface of said strainer body tightly contiguous to the peripheral surfaces of said core heads 10 and 11, so that no gaps are produced between the heads and strainer body which would be likely to permit inflow of unstrained fluid to the annular space 15 between the heads. The height or widths of the heads 10 and 11 are therefore made substantial in extent, not only to provide a substantial area of supporting surface for the applied strainer body, but to assure against inflow of unstrained fluid. Such height or width of the heads 10 and 11 may be selectively varied according to the kind and viscosity of the fluid to be dealt with.

Engaged around the external peripheral surface of the strainer body 21 is a perforate keeper sleeve 22 adapted to hold the mesh layers of the strainer body in place and against unwinding. To the end that such keeper sleeve 22 offer as little obstruction to inflow of fluid to and through the strainer body as possible, it is preferable to form said keeper sleeve from square woven wire mesh of comparatively large mesh opening area.

To hold the strainer body 21 and its keeper sleeve 22 assembled with and against displacement from the core, a keeper pin or fastener spike 23 is driven inwardly through the sleeve and body and into the material of the core; and said keeper pin or fastener spike 23 is preferably provided with an inverted U-shaped or hook-like outer end 24 to hook over a wire course of the keeper sleeve 22 (see Figs. 2 and 3).

In Fig. 4 is shown a somewhat modified form of the spool-like core part of the strainer unit, the same comprising a tubular center member or pipe 30, upon which are fixedly mounted, in spaced apart relation, diametrically enlarged annular head members 31 and 32. The lower head member 32 is closed by an end wall 33, thus forming a closed socket 34 in which the lower end of the center member or pipe 30 is footed. The upper head member 31 is provided with a central opening 35 through which the upper end portion of the center member or pipe 30 extends to project exteriorly thereof. The exterior end portion 36 of said center member or pipe 30 is suitably screw-threaded whereby to engage and couple core to and in communication with a clean fluid conduit means (not shown). The interior of the center member or pipe 30 provides an axial discharge passage 37 for outflow of clean fluid from the strainer unit. Intermediate the head members 31 and 32 and surrounding the center member or pipe 30 is an annular space 38, and provided in the walls of said center member or pipe 30 are one or more openings 39 to afford communication between said annular space 38 and said discharge passage 37. Mounted on the thus modified spool-like core is the strainer body 21 which is constructed and attached in the same manner as already set forth with respect to the first described strainer unit construction.

When the strainer unit of this invention is attached to a clean fluid discharge conduit and submerged in the supply of fluid to be strained as it is pumped or otherwise caused to flow through the strainer unit to the discharge conduit, owing to the fact that the strainer body 21 has both its peripheral and end surface areas exposed to the fluid supply, a maximum of external surface area is provided whereby not only is the straining efficiency of the body increased, but inflow of fluid thereto is subjected to but a minimum of restriction, and consequently a rapid straining flow through the strainer body is easily maintained. The annular space intermediate the spool-like core and the inner surface of the strainer body provides a plenum for clean fluid against which pumping suction can effectively work.

One of the marked advantages of the novel strainer unit construction according to this invention is its low cost. Since the construction may be produced from comparatively inexpensive materials, and since machining and labor costs are reduced to a minimum, the strainer unit may be produced and supplied to users at such low cost that, after its efficient use life terminates, it may be discarded or thrown away and replaced by a new unit, thus obviating necessity for employing costly and time consuming strainer cleaning operations.

It will be understood that various changes could be made and apparently widely different embodiments of this invention could be made without departing from the scope thereof as defined in the following claims. It is therefore intended that all matter contained in the above description or shown in the accompanying drawing shall be interpreted as illustrative and not in a limiting sense.

I claim:

1. A strainer unit comprising a spool-like core formed by spaced head portions of substantial length and an intermediate portion of reduced diameter, said core having an axial passage closed at one end and open at the opposite end for connection with clean fluid discharge means, said intermediate portion of the core having lateral fluid passage means leading from its exterior to said axial passage, a foraminous strainer body surrounding said core so as to engage the heads thereof in bridging relation therebetween, whereby to provide an annular plenum between the interior periphery of said strainer body and said intermediate portion of said core, both the external peripheral and end areas of said strainer body being exposed to entrance of fluid for inflow through said body, material wound about said core and upon itself into a multiplicity of convolved contiguous layers, whereby to form a body of desired mass and diameter, a perforate keeper sleeve surrounding the external periphery of said body, and an anchoring spike passing through said sleeve and body and into said core to hold said sleeve and body against displacement from the core.

2. A strainer unit comprising a spool-like core having an axial passage for connection with clean fluid discharge means, a foraminous strainer body surrounding said core, both the external peripheral and end areas of said body being exposed to entrance of fluid for inflow through said body, said core having lateral fluid passage means leading from the interior of said strainer body to the axial passage of said core, said strainer body comprising knitted metallic mesh material wound about said core and upon itself into a multiplicity of convolved contiguous layers, whereby to form a body of desired mass and diameter, a perforate keeper sleeve surrounding the external periphery of said body, and an anchoring spike passing through said sleeve and body and into said core to hold said sleeve and body against displacement from the core.

3. A strainer unit comprising a spool-like core having an axial passage for connection with clean fluid discharge means, a foraminous strainer body surrounding said core, both the external peripheral and end areas of said body being exposed to entrance of fluid for inflow through said body, said core having lateral fluid passage means leading from the interior of said strainer body to the axial passage of said core, said strainer body comprising knitted metallic mesh material formed with oblique crosswise extending corrugations, said mesh material being wound about said core and upon itself into a multiplicity of convolved contiguous layers, with the corrugations of contiguous layers crossing one another, whereby to form a body of desired mass and diameter, a perforate keeper sleeve surrounding the external periphery of said body, and means to anchor said sleeve and body to the core.

4. A strainer unit comprising a spool-like core formed by spaced head portions of substantial length and an intermediate portion of reduced diameter, said core having an axial passage closed at one end and open at the opposite end for connection with clean fluid discharge means, said intermediate portion of said core having lateral fluid passage means leading from its exterior to said axial passage, a foraminous strainer body surrounding said core so as to engage the heads thereof in bridging relation therebetween, whereby to provide an annular plenum between the interior periphery of said strainer body and said intermediate portion of said core, both the external peripheral and end areas of said strainer body being exposed to entrance of fluid for inflow through said body, said strainer body comprising knitted metallic mesh material formed with oblique crosswise extending corrugations, said mesh material being wound about said core and upon itself into a multiplicity of convolved contiguous layers, with the corrugations of contiguous layers crossing one another, whereby to form a body of desired mass and diameter, a perforate keeper sleeve surrounding the external periphery of said body, and an anchoring spike passing through said sleeve and body and into said core to hold said sleeve and body against displacement from the core.

RUSSELL B. KINGMAN.